United States Patent [19]
Ward, deceased

[11] B 3,924,783
[45] Dec. 9, 1975

[54] REVERSIBLE HOPPER PARTITION FOR COMBINE DRILL

[75] Inventor: Frederick H. Ward, deceased, late of Coventry, England, by Dilys Annie Jane Ward, administratrix

[73] Assignee: Massey-Ferguson-Perkins Limited, London, England

[22] Filed: Nov. 8, 1972

[21] Appl. No.: 304,687

[44] Published under the Trial Voluntary Protest Program on January 28, 1975 as document no. B 304,687.

[30] Foreign Application Priority Data
Nov. 18, 1971 United Kingdom............... 53712/71

[52] U.S. Cl................................... 222/134; 220/22
[51] Int. Cl.² .......................................... B65D 1/24
[58] Field of Search.............. 220/20.5, 20, 22, 83, 220/22.1–22.6; 68/143, 145; 222/129, 133, 134

[56] References Cited
UNITED STATES PATENTS

| 334,798 | 1/1886 | Moran | 68/143 |
|---|---|---|---|
| 1,880,461 | 10/1932 | Moyes | 220/22 |
| 2,279,426 | 4/1942 | Walsh | 220/22 |
| 2,737,315 | 3/1956 | Rose | 222/129 |
| 2,970,532 | 2/1961 | Skelton | 222/134 |
| 3,238,004 | 3/1966 | Goebel | 220/22 |
| 3,305,076 | 2/1967 | Fleenor | 220/22 |
| 3,432,064 | 3/1969 | Tenpas et al. | 220/22 |
| 3,584,135 | 6/1971 | Dowtin | 220/20 |
| 3,645,416 | 2/1972 | Main, Jr. | 220/22 |
| 3,738,129 | 6/1973 | Biesinger et al. | 68/145 |

FOREIGN PATENTS OR APPLICATIONS
163,544   5/1921   United Kingdom............... 220/22.6

Primary Examiner—William I. Price
Assistant Examiner—Joseph Man-Fu Moy
Attorney, Agent, or Firm—Robert L. Farris

[57] ABSTRACT

A grain drill with a combination seed and fertilizer hopper having a partition wall. The partition wall is shaped to define a recess or hollow. By rotating the partition wall 180°, the size of the fertilizer portion of the hopper relative to the seed portion of the hopper can be changed. Sealing members are provided on the partition wall that cooperate with members inside the hopper in either of the two positions of the partition wall. To prevent escape of seed or fertilizer around the partition wall.

4 Claims, 6 Drawing Figures

REVERSIBLE HOPPER PARTITION FOR COMBINE DRILL

This invention relates to hoppers and in particular, though not exclusively, to hoppers suitable for use in combined seed and fertilizer drills.

According to one aspect of the present invention, there is provided a partition wall suitable for use as the partition wall of a hopper for a combined seed and fertilizer drill wherein the wall is shaped to define a recess or hollow and sealing means is provided, the sealing means being adapted to prevent significant escape of particulate material around the ends of the wall between the said two compartments and including a sealing member at each end of the wall, each sealing member having a sealing surface lying in a plane parallel to the direction of the length of the wall between its ends and extending along at least a major portion of the length of its respective end of the wall.

According to another aspect of the invention there is provided a hopper of the kind set forth wherein a sealing member is provided at each end of the partition wall and complementary sealing members are mounted in the hopper for sealing engagement therewith, the arrangement being such that the sealing members on the wall and in the hopper can be held in sealing engagement by applying a force to the wall in a direction at right angles to the direction of the length of the wall between the said ends.

Preferably the sealing members both on the partition wall and in the hopper are in the form of flanges having substantially flat sealing surfaces.

It is also preferable that the arrangement is such that the same sealing surface of each sealing member in the hopper is engaged by the sealing members on the partition wall in both positions of the wall.

An embodiment of the invention will now be described by way of example with reference to the accompanying drawings in which.

Figure 1:
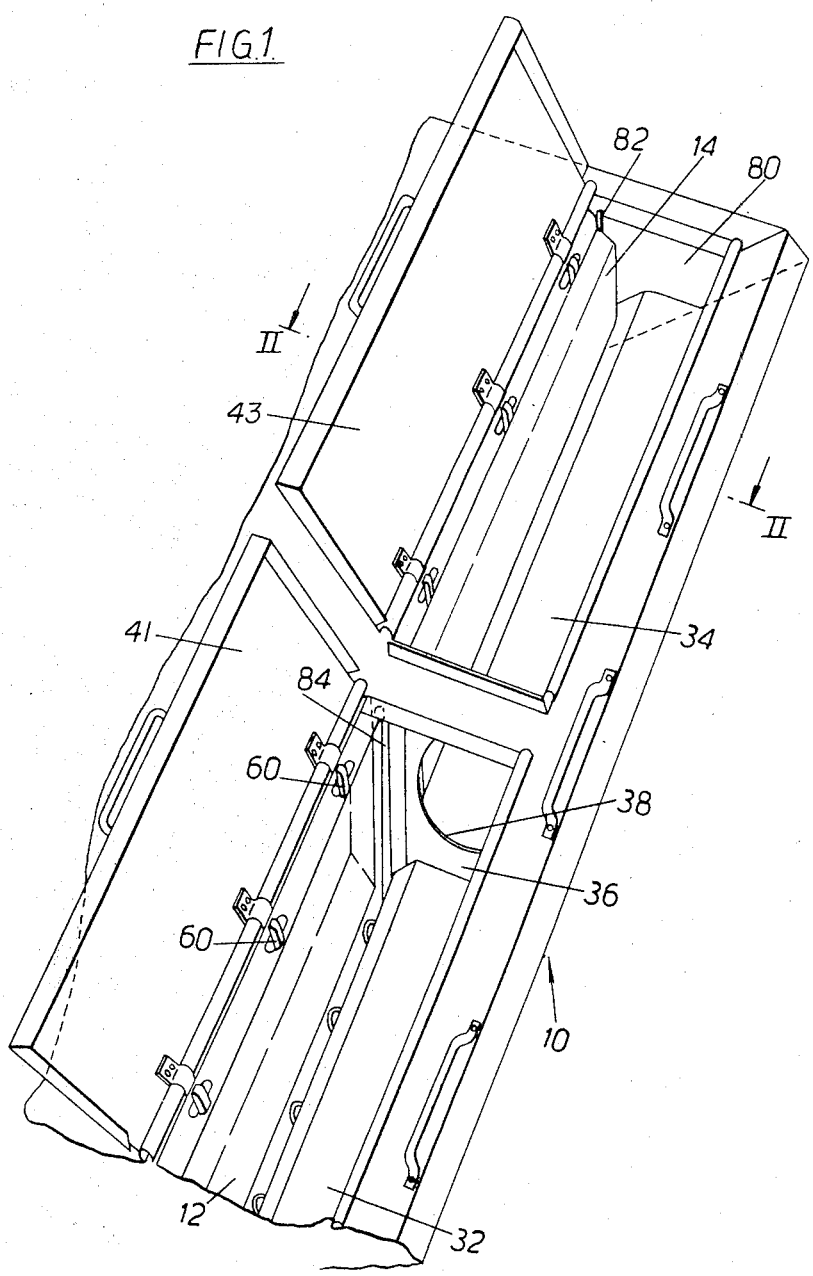
FIG. 1 is a perspective view from above of a combined seed and fertilizer drill having a hopper according to the invention, the drill being viewed from the rear left hand end thereof.
Figure 2:
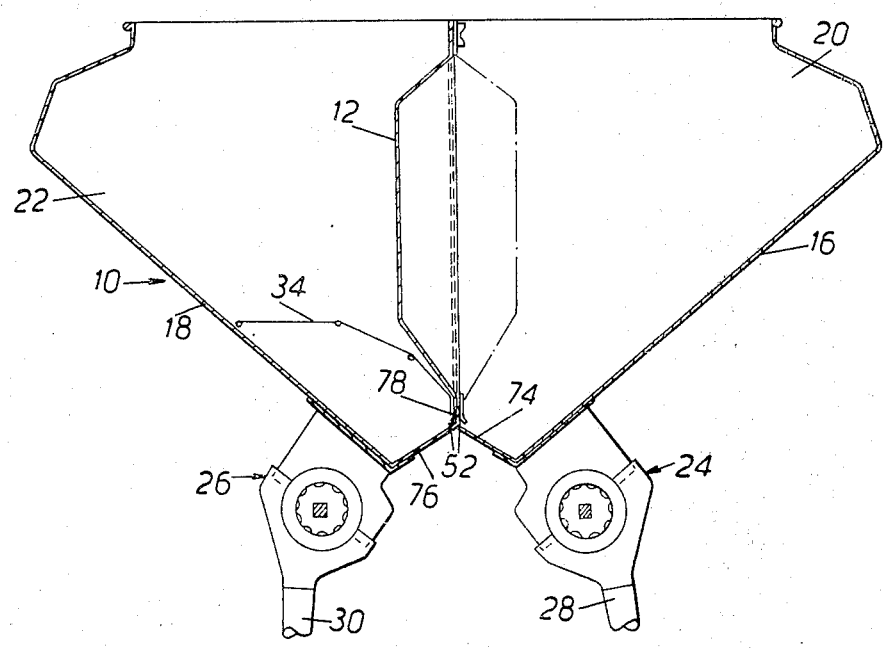
FIG. 2 is a diagrammatic cross-section taken on the line II—II in FIG. 1.

Referring to FIGS. 1 and 2, a combined seed and fertilizer drill comprises a hopper 10 carried on ground wheels (not shown) and trailed by a tractor (also not shown).

The hopper 10 has partition means including partition walls 12 and 14 extending in a direction parallel to the direction of the length of the downwardly converging front and rear hopper walls 16, 18 respectively, and dividing the hopper into front and rear compartments 20, 22 respectively.

Openings (not shown) are formed at transversely spaced positions in each of the hopper walls 16, 18 and seed and fertilizer metering mechanisms 24, 26 respectively are mounted to receive seed and fertilizer therefrom. The metering mechanisms dispense seed and fertilizer at predetermined rates through drop tubes 28, 30 to coulters (not shown) which deposit these materials in the ground in rows. The details of the construction, arrangement and operation of a suitable metering mechanism for this purpose are to be found in our co-pending U.K. patent application No. 46970/68.

Wire mesh screens 32, 34 are provided in the rear fertilizer compartment 22 to screen the fertilizer before it reaches metering mechanism 26 and prevent lumps fouling the mechanism.

The front and rear compartments 20, 22 are each divided into left and right hand ends by a forwardly extending fixed internal wall 36 having large circular openings 38 formed therein one at each end to interconnect the right and left hand ends of the front and rear compartments. Hinged lids 41, 43 (not shown in FIG. 2) are provided to give access to the left and right hand ends of the rear compartment 22 and similar lids (not shown) are provided for the front compartment 20.

Figure 5:
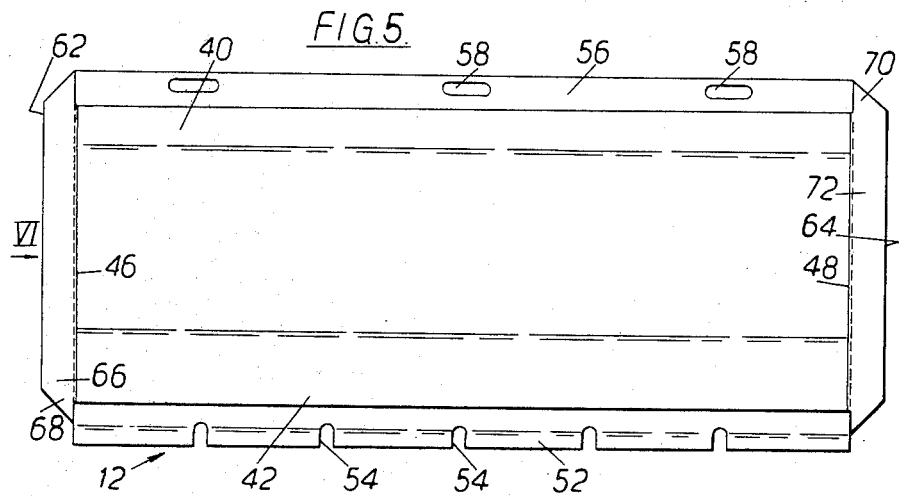
FIG. 5 shows one of the hopper partition walls in side elevation.
Figure 6:
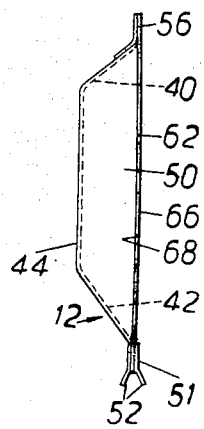
FIG. 6 shows an end elevation of the wall as seen in the direction indicated by arrow VI in FIG. 5.

The partition walls 12, 14 are identical in construction and one only will therefore be described. As shown in FIGS. 5 and 6, the wall has sloping top and bottom wall portions 40, 42 joined by a side wall portion 44 and by end walls 46, 48. These wall portions collectively define a recess or hollow 50.

The lower edge 51 of partition wall 12 has a pair of downwardly diverging flanges 52 defining a groove extending along the length of the wall, for a purpose to be described. A series of inverted U-shape notches 54 (see FIG. 5) are formed in the flanges 52 to accommodate bolt heads when the partition wall is mounted in the hopper.

The upper edge of partition wall 12 has a longitudinally extending flange 56 in which three round-ended slots 58 are formed to cooperate with clamping means in the form of turn buckles 60 (see FIG. 1) mounted on the hopper 10.

Sealing members in the form of flanges 62, 64 are provided one at each end of partition wall 12. The flanges 62, 64 are coplanar with upper flange 56 and with the lower edge 51 of the partition wall. The flanges 62, 64 are formed of the same pressed sheet steel as the remainder of the partition, and the opposite side surfaces 66, 68 and 70, 72 of the flanges constitute sealing surfaces for a purpose to be described.

As shown in FIG. 2, the bottom of the hopper 10 is formed with two converging upwardly inclined walls 74, 76 extending along the length of the hopper between front and rear walls 16, 18. The walls 74, 76 are surmounted by a flange 78.

The two end walls 80 of hopper 10 are each provided on their inner surface with a sealing member in the form of an inwardly projecting sheet metal flange 82 extending vertically from flange 78 to the top edge of the end wall of the hopper. Sealing members in the form of flanges 84 similar to the flanges 82 are provided on opposite sides of internal wall 36 so as to be aligned with the flanges 82.

In use, the partition walls 12, 14 can each be mounted either in a position corresponding to that of wall 12 in FIG. 1 or to that of wall 14 in FIG. 1. For purposes of illustration the walls have been shown in opposite positions so that the front and rear compartments 20, 22 of the hopper 10 each have the same volume. However the partition walls are primarily intended to be both in the same position so that the compartments 20, 22 have different volumes, as is usually required.

To change the walls between either of their two positions, the turn buckles 60 are turned to free the top edges of the walls, each wall is lifted out of the hopper, laterally inverted i.e. turned through 180 degrees about a vertical axis, and replaced in the hopper with flanges 74, and 78 in mutual sealing engagement. Turn buckles 60 are then used again to clamp the walls in their new positions. Limited angular movement of the partition wall about its bottom edge is permitted by the flanges 74, 78.

Figure 3:
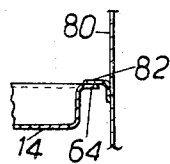
FIGS. 3 and 4 are scrap cross-sectional views of the sealing arrangements of the right hand and left hand partition walls respectively of the hopper of FIG. 1.
Figure 4:
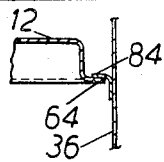

Leakage of seed or fertilizer around the ends of the partition walls is prevented or minimized by the sealing flanges 62, 64 on the partition walls 12, 14 which engage the sealing flanges 82, 84 in the hopper. This is illustrated in FIGS. 3 and 4 which show the sealing arrangements as seen from above in the two positions of the partition walls shown in FIG. 1. It will be noted that the same rearwardly-facing surface of the fixed flange 82 or 84 in the hopper is engaged by the sealing surface 70 of the partition wall in one position thereof, as is engaged by the opposite surface 72 of the sealing member when the partition wall has been reversed.

The embodiment described above has the advantage that the partition walls are very quickly and easily reversible without the use of any tools. Moreover the effectiveness of the seal between the ends of the partition walls and the hopper does not depend on the accuracy to which the lengths of the walls have been matched to that of the hopper. For effective sealing, all that is required is reasonable overlap between the flanges on the partition wall and the hopper.

What I claim is:

1. A combined seed and fertilizer drill hopper with at least one reversible partition wall for dividing the hopper into front and rear compartments characterized by the hopper including wall means forming an elongated trough, end walls and an open top, at least two rows of openings in the lower portion of said elongated trough, seed and fertilizer metering mechanisms each positioned to receive either seed or fertilizer from at least one of the openings in the lower portion of said elongated trough, a generally vertical elongated bottom flange attached to the wall means forming an elongated trough between rows of openings in the lower portion of said elongated trough, and at least two generally vertical end flanges extending inwardly from each end wall and lying substantially in a plane that is parallel to the long axis of the elongated trough and that contains the bottom flange; and the reversible partition wall for dividing the hopper into compartments including partition bottom flange means and two partition end flanges in substantially the same generally vertical plane parallel to the long axis of the reversible partition wall and a section of the partition wall between said flanges that is recessed to one side of the plane that is parallel to the long axis of the reversible partition wall and fastening means for holding the flanges on the reversible partition wall in engagement with the flanges in the hopper with the recessed portion of the partition wall extending into either the front or the rear compartment.

2. The combined seed and fertilizer drill hopper of claim 1 wherein the hopper includes an elongated top flange that is parallel to and spaced above the bottom flange and the reversible partition wall includes an upper partition flange either side of which is engagable with the elongated top flange in the hopper.

3. The combined seed and fertilizer drill hopper of claim 1 wherein the partition bottom flange means on the bottom edge of the reversible partition wall includes a groove extending along the length of the wall for receiving the elongated bottom flange attached to the elongated trough with the recessed portion of the partition wall extending into either the front or the rear compartment.

4. The combined seed and fertilizer drill hopper of claim 2 wherein the partition bottom flange means on the bottom edge of the reversible partition wall includes a groove extending along the length of the wall for receiving the elongated bottom flange attached to the elongated trough with the recessed portion of the partition wall extending into either the front or the rear compartment.

* * * * *